March 21, 1950        P. M. FULLER        2,501,466
FISHING REEL
Filed Oct. 12, 1944
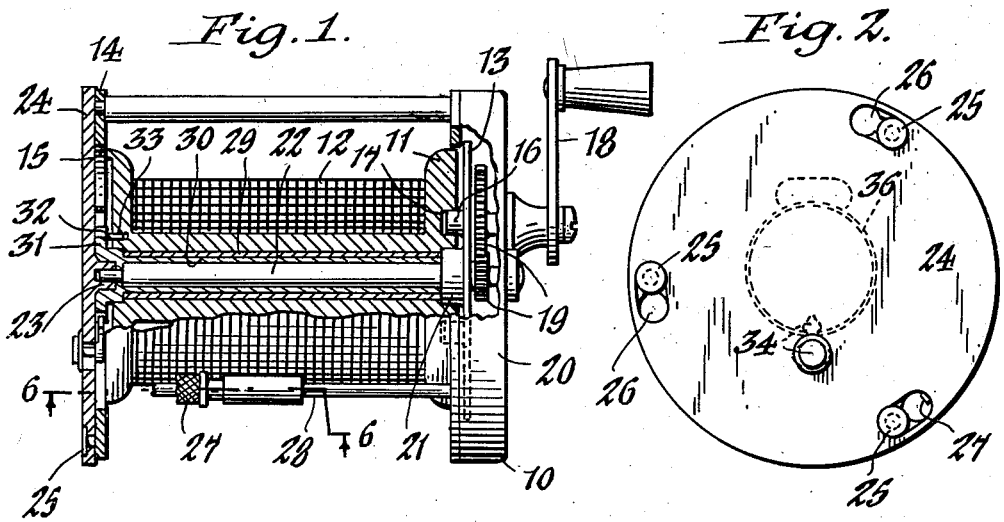
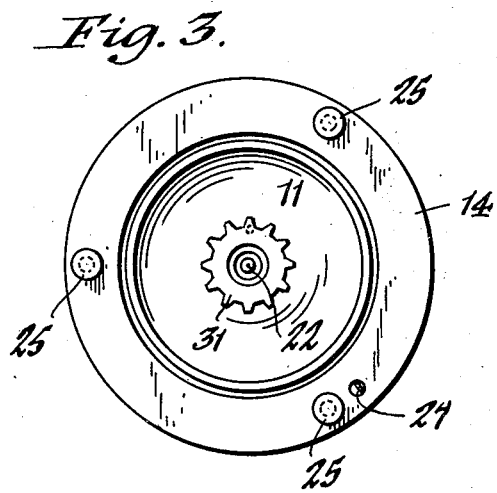
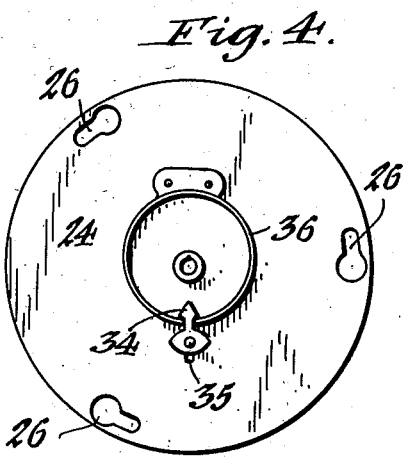
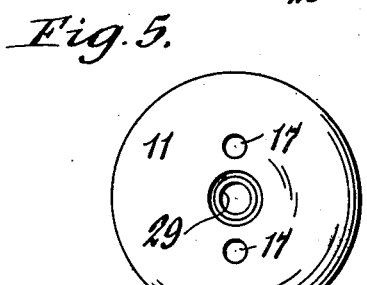
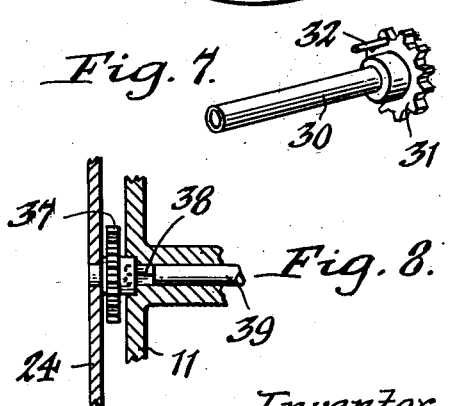
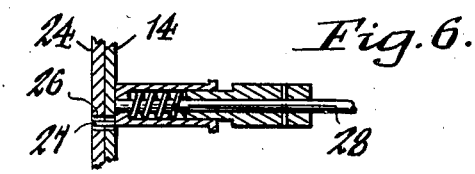
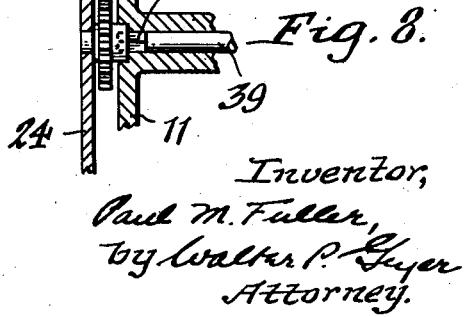
Inventor,
Paul M. Fuller,
by Walter P. Guyer
Attorney.

Patented Mar. 21, 1950

2,501,466

UNITED STATES PATENT OFFICE 2,501,466

FISHING REEL

Paul M. Fuller, Buffalo, N. Y.

Application October 12, 1944, Serial No. 558,375

3 Claims. (Cl. 242—84.6)

1

This invention relates to certain new and useful improvements in fishing reels and like devices.

It has for its primary object to provide a device of this character which is so designed and constructed as to enable the spool element of the reel to be readily applied to and removed from its operative position therein, whereby different spools may be selectively used in the reel and in the case of fishing, the spools constitute the package on which the line is directly wound and the proper line-spool used to suit the type of fishing desired.

Another object of the invention is to provide a fishing reel and replaceable spool construction wherein the spool serves as the package or container for a given size of line as well as the winding element of the reel, with simple and effective means provided for detachably mounting one or another of a plurality of spools in operative relation on the reel.

Other features of the invention reside in the construction and arrangement of parts hereinafter described and particularly pointed out in the appended claims.

In the accompanying drawings:

Figure 1 is a sectional elevation of the fishing reel and the detachable packing element in position thereon. Figure 2 is an end view of that end of the reel bearing the detachable cover plate. Figure 3 is a similar view with the cover plate removed. Figure 4 is an inside face view of the cover plate. Figure 5 is an end view of the packaging spool. Figure 6 is an enlarged fragmentary section taken on line 6—6, Figure 1. Figure 7 is a detached perspective view of the ratchet wheel and its shaft. Figure 8 is a fragmentary sectional view showing a modified mounting of the ratchet wheel.

Similar characters of reference indicate corresponding parts throughout the several views.

In carrying out my invention, I provide a reel body 10 which is adapted to removably receive one or another of a plurality of packaging members, one of which is mounted on the reel shown in the drawings and which includes a spool 11 and a fishing line 12 borne directly thereby. The different packaging members contain lines of different size or weight to suit different types of fishing, and may be of different colors to easily distinguish them from one another, and when the user desires to use a certain weight of line in the reel he inserts the companion line-bearing spool into position for operation and when he later desires to use a different form of line he removes the previously installed packaging member and replaces it with the package containing the proper line.

The reel body may be of any suitable construction, that shown in the drawings including a rotatable head 13 at one end and a fixed head or tail ring 14 at its opposite end containing an opening 15 through which the packaging member is inserted and removed. The rotatable head and the spool 11 are provided with complementary clutching elements which may be in the form of bosses 16 and sockets 17 and the head is rotated by a crank 18 through the medium of gearing 19 journaled in an end housing 20 of the reel body. The rotating head 13 is also provided with an axial boss or collar 21 from which projects a spindle 22 which is supported at its outer end in a bearing 23 formed on a cover or retainer plate 24 detachably applied to the tail-ring 14 and serving to retain or clamp the packaging member in its operative position in the reel body. The means employed for detachably connecting this cover plate to the tail-ring consist of headed studs 25 applied at suitably spaced points on the tail-ring and keyhole-shaped slots 26 formed in the cover plate, so that by turning the latter relatively to the tail-ring in one direction or the other the cover plate is in its released or clamping position. A spring-pressed bolt or latch 27 is applied to one of the tie rods 28 of the reel body to releasably engage one of the keyhole slots 26 and thereby latch the cover plate 24 against turning out of its clamped position. When it is desired to replace a packaging member, this latching bolt is released from the companion keyhole slot in the cover plate to enable the latter to be turned in a direction to bring the circular portions of the slots into register with the heads 25, enabling the cover plate to be detached and permitting withdrawal of the package member endwise through the opening 15 in the head-ring.

The spool 11 of the packaging member is provided axially thereof with a bearing sleeve 29 and detachably engageable with this sleeve is a hollow shaft 30 which terminates at one end in a ratchet wheel 31 having a coupling pin 32 thereon adapted to engage a corresponding opening 33 formed in the outer end of the spool 11, so that in the assembled position of the parts the hollow shaft is supported on the spindle 22 and the ratchet wheel is coupled with the spool to turn therewith when the crank 18 is operated. Cooperating with this ratchet is a displaceable, button-actuated pawl 34 guided in a slot 35 in the cover plate 24 for movement into and out of cooperative engagement with the ratchet wheel. A split circular spring 36 cooperates with this pawl to yieldingly retain it in its ratcheting position.

If desired, as shown at 37 in Figure 8, the ratchet wheel may be journaled directly on the cover plate 24 and removably engage the key-shaped end 38 of the spindle 39 to be driven thereby.

In use, assuming that a spool 11 bearing a certain weight of line is in its assembled position in the reel body, and it is desired to replace it with a spool bearing a different weight of line, the dog 34 is displaced outwardly by the actuating button connected thereto, the latching bolt 27 is withdrawn from its latching position and the cover plate 24 then turned a fraction of a revolution to uncouple it from the studs 25. The cover plate is then removed to expose the end of the spool and the latter withdrawn from the spindle 22 through the end-opening 15, together with the ratchet wheel 31. Thereupon, the latter is applied to the replaced spool which is mounted on the spindle with its sockets 17 in register with the coupling bosses 16 on the driving head 13. The cover-plate 24 is then restored in position on the tail-ring 14 and its dog 34 shifted inwardly into engagement with the ratchet wheel 31 with the latching bolt 27 engaged with the registering keyhole slot 26 to latch said plate against turning, thereby placing the reel in readiness for use.

I claim as my invention:

1. A fishing reel, comprising a body having spool-rotating means at one end thereof and an axially-disposed, spool-inserting opening at the opposite end thereof, a cover plate detachably mounted on said body over the opening thereof, a packaging member including a spool and a line detachably mounted on said body between its rotating means and said cover plate, and complementary means on said body and said cover plate for releasably clamping the latter to the former, said means consisting of headed studs on said body and key-hole shaped slots in said cover plate and a releasable latch applied to said body and engageable with said cover plate to prevent its turning out of its clamped position.

2. A reel, comprising a body having a rotatable drive means at one end thereof and a detachable spool-engaging support at its opposite end adapted to turn relatively thereto, a line-bearing spool removably mounted on said body between its drive means and said support, complementary elements on said drive means and said spool for clutching the latter in driving engagement with the former, complementary stud and slot means on said body and said spool-support for releasably clamping the latter to the former, and means for releasably retaining said support against turning on the reel body including a retractible latching bolt.

3. A fishing reel, comprising a body having spool-rotating means at one end thereof and an axially-disposed, spool inserting opening at the opposite end thereof, a cover plate detachably mounted on said body over the opening thereof, a packaging member including a spool and a line detachably mounted on said body between its rotating means and said cover plate, a hollow shaft disposed axially of the body and provided at one end with a ratchet wheel adapted for detachable coupling engagement with the opposing end of said spool to turn therewith, a displaceable pawl mounted on said cover plate for movement into and out of engagement with said ratchet wheel, and complementary means on said body and said cover plate for releasably clamping the latter to the former.

PAUL M. FULLER.

REFERENCES CITED

The following references are of record in the file of this patent:

UNITED STATES PATENTS

| Number | Name | Date |
| --- | --- | --- |
| 147,414 | MacCord | Feb. 10, 1874 |
| 731,226 | Rockwell | June 16, 1903 |
| 832,291 | Bryant | Oct. 2, 1906 |
| 847,350 | Marhoff | Mar. 19, 1907 |
| 1,321,284 | Carter | Nov. 11, 1919 |
| 2,204,125 | Dayton | June 11, 1940 |
| 2,231,340 | Lee | Feb. 11, 1941 |
| 2,366,920 | McMahon | Jan. 9, 1945 |

FOREIGN PATENTS

| Number | Country | Date |
| --- | --- | --- |
| 649,232 | France | Dec. 19, 1928 |